Nov. 7, 1933.                J. R. KOVAR                1,933,559
METHOD OF MAKING SPRING HARROW TEETH
Filed April 18, 1932
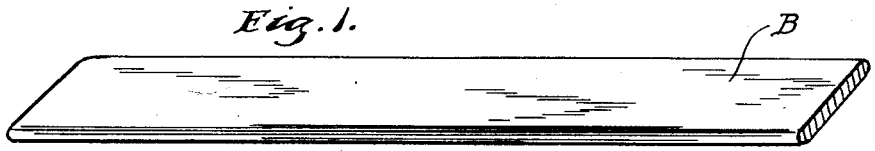
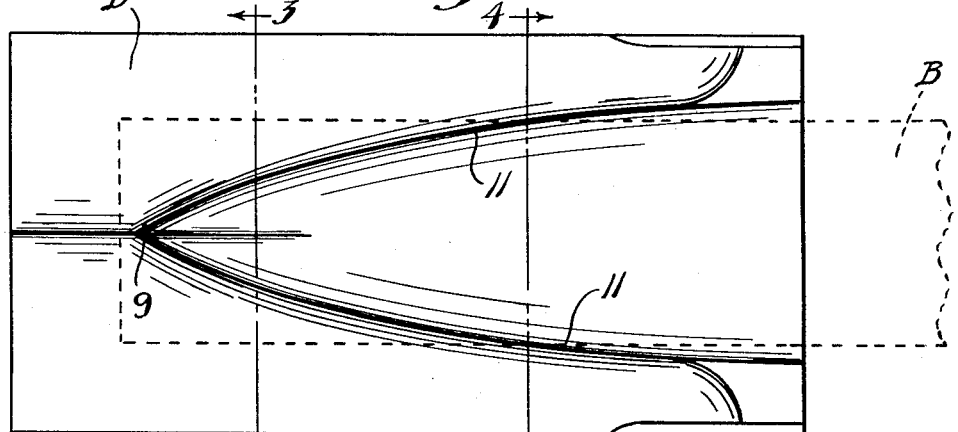
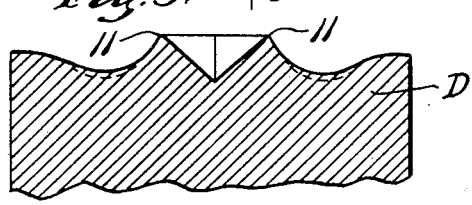   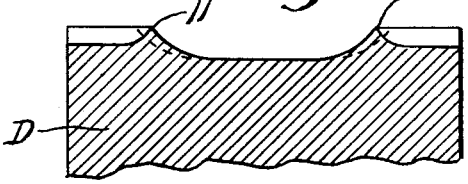
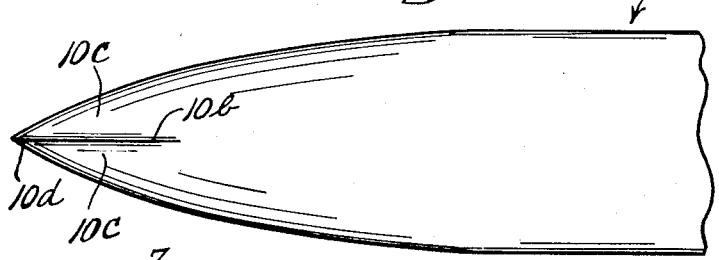
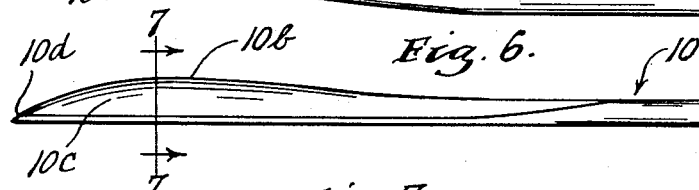
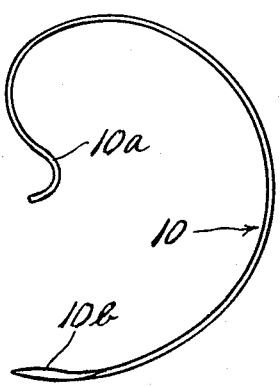
INVENTOR
JOHN R. KOVAR.
BY HIS ATTORNEYS.
Williamson & Williamson Patented Nov. 7, 1933

1,933,559

UNITED STATES PATENT OFFICE 1,933,559

METHOD OF MAKING SPRING HARROW TEETH

John R. Kovar, Owatonna, Minn.

Application April 18, 1932. Serial No. 605,869

4 Claims. (Cl. 76—101)

This invention relates to a tooth for an agricultural or ground-working implement, such as a cultivator or harrow and more particularly to a spring tooth for a harrow or cultivator and an improved method for making the same.

In spring tooth harrows the teeth are usually of involute form or shape and are constructed from some resilient spring material, such as spring steel. It is very desirable to construct the teeth so that the ground will pass over the teeth easily and will produce a scouring action on the point or free ends of the teeth in so doing. The teeth, of course, are subjected to materially more wear at the free ends or points than at any other portion. For this reason it is desirable to make the free ends or points of the teeth stronger and more durable than the other portions thereof, as well as to form the free ends or points so that the correct diverging shape of the points will be maintained for a relatively long period. It is also highly desirable to construct the teeth economically, preferably from elongated flat, straight bars which can be purchased cheaply from steel manufacturing companies.

It is an object of my invention to provide an improved and highly efficient spring tooth for harrows and cultivators having the characteristics above enumerated.

It is a further object to provide an improved spring tooth which may be constructed from an integral relatively narrow, straight, flat bar, which has a free end terminating in a sharp point and materially thickened throughout a considerable distance from the point and so shaped that when it passes through the ground it will produce a scouring action on the top and bottom surfaces of the free end and will cause the earth to move thereover rearwardly and laterally, the dirt being thoroughly loosened and turned whereby the air and sun rays may penetrate the seed bed.

It is a further object to provide an improved and simple method for making a spring tooth for a harrow or cultivator of the characteristics above enumerated.

It is another object to provide a method for constructing a spring tooth of the class described wherein the characteristics of the spring steel or other material at the free end portion of the tooth are materially improved as to tensile strength and wearing qualities.

These and other objects and advantages of the invention will be more fully set forth in the following description made in connection with the accompanying drawing, in which like reference characters refer to similar parts throughout the several views, and in which:—

Fig. 1 is a perspective view showing a portion of a straight, relatively narrow bar of spring steel from which my improved tooth is constructed;

Fig. 2 is a top plan view illustrating a suitable die or anvil for shaping the free end of the tooth and compacting the molecules of the steel;

Fig. 3 is a cross section of the die or anvil taken on the line 3—3 of Fig. 2;

Fig. 4 is a similar cross section taken on the line 4—4 of Fig. 2;

Fig. 5 is a fragmentary top plan view of the tooth when completed some time before being bent into involute shape showing the convex surfaces diverging from the tip of the point and the sharp bevel at the longitudinal center line;

Fig. 6 is a fragmentary side elevation of the free end of the formed tooth before it has been bent into involute shape;

Fig. 7 is a cross section taken on the line 7—7 of Fig. 6 showing the increased thickness of the free end portion of the tooth and the tapering of the thickness as well as the convex upper surface and substantially flat under surface, and Fig. 8 is a side elevation in greatly reduced scale of the completed spring tooth.

My completed spring tooth, as shown in Fig. 8, is of conventional involute form constructed of suitable spring steel having adequate strength and resiliency. The inner end of the tooth is provided with the usual attachment portion 10a, while the outer or free end of the tooth, as clearly shown in Figs. 5 to 7, is materially thickened beyond the thickness of the remaining portion of the tooth. The tooth has its greatest thickness substantially at the medial portion 10b of its free end, which point is also on the longitudinal center of the free end. The free end of the tooth gradually becomes thinner until the upper and convex surface thereof merges into the flat surface of the bar from which the tooth is constructed. The under surface of the free end of the tooth is substantially flat, that is, it is preferably neither concave nor convex. The upper surface of the tooth adjacent the point is convex, being defined by downwardly sloping faces 10c which meet upon a well defined longitudinal center line 10d. The specific shaping of the upper surfaces of the tooth at its free end can be accurately ascertained from an inspection of Figs. 5 to 7 of the drawing.

My improved and simplified method for making the tooth previously described is substantially as follows:

The tooth is constructed, preferably, from a flat strip or bar B of spring steel, the width of which is relatively great as contrasted with its thickness. In practice, it has been found that an efficient size of material is that having a width of about 1¾ inches and a thickness of ¼ inch. A portion of a bar is illustrated in Fig. 1.

One end of the straight bar B is first heated to a temperature of approximately 1800 degrees F. The heated end of the bar is then hammered into a suitably shaped die or anvil which has a recess somewhat deeper than the thickness of the bar and of somewhat less width than the bar, the recess being so shaped as to produce the contour of the tooth illustrated in Figs. 5 to 7. A suitable form of die or anvil is illustrated in Figs. 2 to 4 wherein it will be noted that the recess is formed at its sides by a sharp edged flange 11 raised above the surface of the anvil, the edges of said flange diverging from a point 11a and the depth and shape of the recess in the anvil being formed as illustrated.

In hammering or forging the heated end of the bar, I prefer to drive the material into the recess by a multiplicity of successive blows forcing the material from the sides of the bar inwardly and simultaneously compacting the molecules of the metal. The hammering is continued until the outer surface of the bar in the die or anvil is substantially flat. The bar is then withdrawn and allowed to cool. It will be understood that stock from the longitudinal sides of the bar in the hammering process is hammered laterally inward to the center and that the entire free end hammered into the die is compacted materially by the hammering action.

The bar so formed is next bent into the involute shape shown in Fig. 8. The diverging longitudinal edges of the free end are sheared or ground either before or after the bar has been shaped into involute form and if desired the upper and lower surfaces of the free end may be polished.

My improved tooth formed in accordance with the method herein described has not only a thickened and effectively shaped point and free end, but the inherent qualities or characteristics of the metal at the free end of the bar are materially improved. More specifically, in the hammering of the bar into the mold recess of the die, the molecules of the steel or other metal are actually compacted and the free end of the tooth therefore will have greater tensile strength per unit volume and better wearing qualities than the other portions of the tooth. The particular shape of the free end of the tooth and its improved qualities greatly increase its durability and preserve the correct symmetrical tapered shape of the point portion.

The thickened free end of the tooth and the substantially beveled or downwardly inclined sides at the upper surface of the tooth cause the dirt and soil to be substantially lifted and aerated when the tooth is used, as well as producing a scouring action of the soil over the surface of the tooth.

From the foregoing description it will be seen that I have provided an improved and highly efficient method for making a spring tooth for a harrow or cultivator which can be carried out at relatively low cost and will be effective to make a stronger, more durable and more efficient tooth. It will further be seen that I have provided an improvement in the structure of spring teeth for harrows.

It will, of course, be understood that various changes may be made in the form, details, proportions and arrangements of the parts, without departing from the scope of my invention, which, generally stated, consists in a device capable of carrying out the objects above set forth and in the novel parts and combinations of parts disclosed and defined in the appended claims.

What is claimed is:—

1. The method of making a spring tooth for a harrow which consists in heating one end of an elongated flat bar of metallic spring material to a relatively high temperature, hammering said heated end into a recessed mold portion of a die wherein the recess is of greater depth but less width than the thickness and width of the bar respectively and in said hammering step forcing the stock of the material inwardly and laterally to fill the recess and further to compact the molecules of the metallic material and bending the bar so formed into involute shape.

2. The method of making a spring tooth for a harrow which consists in heating one end of an elongated flat bar of metallic spring material to a relatively high temperature, hammering said heated end into a recessed portion of a die wherein the recess is of greater depth but less width than the thickness and width of the bar and in so doing compacting the molecules of the metallic material of the bar and forming a thickened point for the tooth, treating the longitudinal edges to define the point and bending the bar into involute shape.

3. The method of making a spring harrow tooth or the like which consists in softening by heat one end of a relatively thin metal bar and forging said softened end into a tapered point of greater thickness than said bar by hammering one surface of said bar and simultaneously guiding the hammered material inwardly and laterally of the longitudinal edges of said bar to compact the molecules of said material.

4. The method of making a spring harrow tooth or the like which consists in softening by heat one end of an elongated relatively thin metal bar, hammering said heated and softened end into a recessed die wherein the side walls converge both transversely and longitudinally and wherein the volume of the recessed portion is substantially less than the volume of the hammered end of the bar and in so doing compacting the molecules of the hammered portion of the bar and forming a thickened point.

JOHN R. KOVAR.